July 24, 1956 C. M. RUTLEDGE 2,756,064
COLLAPSIBLE FRAME FOR GOLF CARTS
Filed Jan. 20, 1951 2 Sheets-Sheet 1
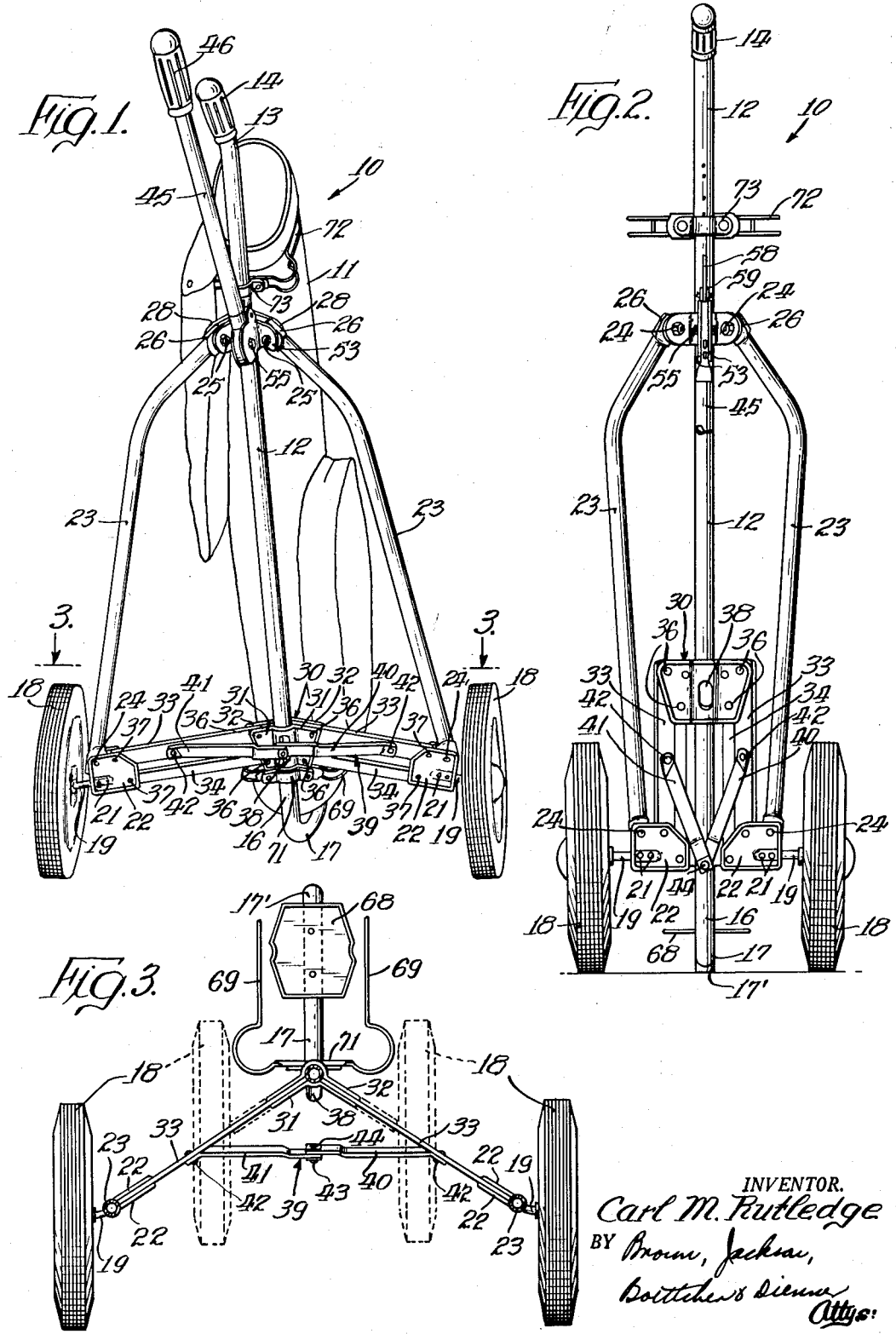
INVENTOR.
Carl M. Rutledge
BY Brown, Jackson,
Boettcher & Dienner
Attys.

July 24, 1956 C. M. RUTLEDGE 2,756,064
COLLAPSIBLE FRAME FOR GOLF CARTS
Filed Jan. 20, 1951 2 Sheets-Sheet 2
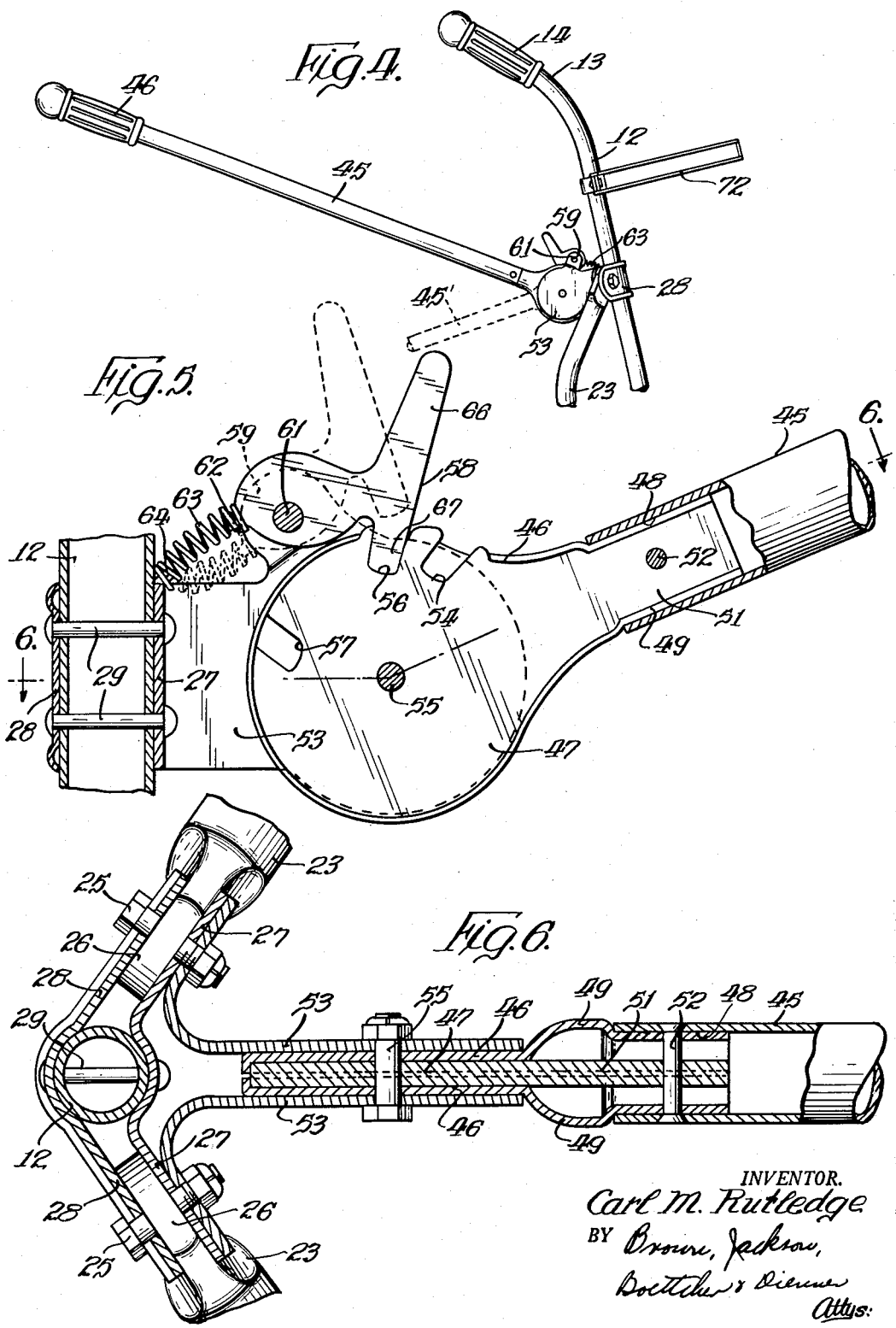
INVENTOR.
Carl M. Rutledge
BY Brown, Jackson,
Boettcher & Dienner
Attys.

United States Patent Office

2,756,064
Patented July 24, 1956

2,756,064

COLLAPSIBLE FRAME FOR GOLF CARTS

Carl M. Rutledge, Chicago, Ill.

Application January 20, 1951, Serial No. 207,001

3 Claims. (Cl. 280—41)

This invention relates generally to wheeled carts and is particularly related to a collapsible type of two-wheel cart which will be extremely rigid when in the set up condition so as to traverse rough terrain without distortion. While the cart may be employed for carrying a wide variety of objects such as luggage, fire extinguishers, tools, etc., it is particularly well adapted for carrying a golf bag and will be described in that connection. However, that is solely for purposes of illustration and is not intended to limit the scope of the invention or the subjoined claims.

It is a primary object of this invention to provide a cart which will support an object when either in the collapsed condition or the extended position, and to afford a construction which will make the cart extremely rigid so that it can traverse rough terrain, such as is encountered, for example, on a golf course without twisting or straining the frame thereof.

Another object of the invention is to afford a simple and convenient tow bar or handle for such a cart, which tow bar may be readily and conveniently adjusted in position according to the needs and stature of the user, and according to whether the cart is to be maintained in the collapsed or extended position, or in a position of rest at some location, for example, at a tee or elsewhere on a golf course.

According to the present invention a rigid substantially pyramidal shaped structure is so arranged that one of the members of the structure forms both a towing bar for the cart and a support therefor. The members forming the substantially pyramidal shaped frame are hingedly joined together by plates which enable the members to be moved to a collapsed position. An opposite pair of such plates form a support for stub axles for wheels for moving the cart in either a collapsed or in an extended position. Said opposite pair of plates also form end points of connection for a pair of arms extending from a block sliding on the supporting member whereby the cart may be moved to a collapsed position. A jointed strut connects said arms at a point adjacent the point of connection of the arms with the plates so that the wheels may be prevented from moving out of substantial parallelism with each other in traversing irregular terrain, and so that the structure will not twist in traversing such terrain. The jointed strut joining such arms is movable to a straight line position and also movable to a folded position for the collapsed position of the cart.

The tow bar is further characterized by being capable of being locked in a number of different positions according to the personal liking of the user, or according to whether it is desired to place the cart in a more or less inclined position of rest with increased supporting strength in that inclined position when the cart and object carried are not being towed. The tow bar is locked into one of a number of desired positions by a simple detent which may be easily operated by the user.

The foregoing and other objects of the invention will become apparent from a study of a specification taken with the drawings which together show a preferred embodiment of the invention and what is now considered to be the best mode of practicing the principles thereof. The precise embodiment of the invention as described herein is capable of variation, and it is intended that the scope of the invention not be limited by the precise embodiment disclosed nor otherwise than by the scope and spirit of the appended claims.

In the drawings:

Figure 1 is a perspective view of a golf cart according to the present invention in the expanded or normal position, with the cart being shown in a standing position and illustrating the placement of a golf bag thereon;

Figure 2 is a front elevation view of the golf cart of Figure 1, in a collapsed, upright position and with the golf bag omitted;

Figure 3 is a sectional view substantially on line 3—3 of Figure 1 looking in the direction of the arrows and showing the wheels of said cart in expanded or normal position in solid line, and in the collapsed position in dotted outline, the golf bag being omitted;

Figure 4 is a side elevation view of a portion of the golf cart shown in Figure 1 showing details of construction of the towing bar and the latching means for holding the towing bar in position;

Figure 5 is a vertical cross section taken through the center post and the latching means of Figure 4 (looking from the reverse side of Figure 4) showing details of construction thereof; and Figure 6 is a section taken on the line 6—6 of Figure 5, looking in the direction of the arrows and showing details of the manner of fastening the towing bar to the center post.

Referring now particularly to Figures 1, 2 and 3 of the drawings, there is shown a golf cart indicated generally by the reference numeral 10, adapted to transport a golf bag 11 from place to place on a golf course as well as to and from a locker room and through the narrow aisles of a locker room or the like. The golf cart 10 includes a main body member in the form of a center post 12 which is bent in a forward direction to provide a handle 13 with a hand grip 14 mounted thereon. The lower end 16 of the center post 12 is bent rearwardly and upwardly and then across and downwardly with the curved portion 17 being adapted to rest on the ground as seen in Figure 1, and with the free end 17' being adapted to engage the ground when the cart is in the position of Figure 2. The cart 10 is provided with a pair of ground engaging wheels 18 which are spaced an equal distance on each side of the center post 12. Each wheel 18 is mounted on a stub axle 19, and the center line of the center post 12 is spaced a distance to the rear of the common line of centers of the wheels 18, so that the wheels 18 and the curved portion 17, or the free end 17', at the lower end 16 of center post 12 can provide a three point support for the cart 10 and the golf bag 11 supported thereon, when the cart 10 is in an extended position as shown in Figure 1, or in a collapsed position as shown in Figure 2.

Each stub shaft 19 is riveted or otherwise fastened as at 21 to gusset plates 22. A brace member 23 extends on each side of the center post 12 and is pivotally connected at its lower end, as at 24, to a gusset plate 22 and extends upwardly toward the center post 12 where it is pivotally connected by a bolt 25 passing through a flattened end 26 of the brace member 23 and the ends of a block comprising a pair of brackets 27, 28 connected by rivets 29 to the center post 12 (see Figure 3).

A sliding block 30 is disposed near the lower end of the center post 12 and consists of a pair of brackets 31 and 32 having their ends extending on each side of the center post 12. Each end of the brackets 31 and 32 is hingedly connected to a pair of parallel arms 33 and 34, as at 36, on each side of the center post 12. The parallel arms 33 and 34 on either side of post 12 are hingedly connected at their outer ends as at 37 to the gusset plate 22. Parallel arms 33 and 34 and braces 23 maintain the wheels 18 in parallelism in both the extended and collapsed positions of the cart. The block 30 is formed with a hook-shaped pedal 38 so that the user of the cart may push the block 30, together with the arms 33 and 34, downwardly away from the block 27, 28 to the position as seen in Figure 1, so that the wheels are moved to the extended position for use of the cart 10, or may pull upwardly on the hook-shaped pedal 38 to move the block 30 toward the block 27, 28 so that the wheels are moved from the position of Figure 1 to the position of Figure 2.

Means are provided to give stability to the brace members 23, 23 and to the parallel arms 33, 34 so that there will be no tendency of the wheels 18 to swivel about the center post 12, or of the framework to distort under heavier than usual loads while the cart 10 is pushed or pulled over irregular terrain. To this end, a jointed strut 39 is formed from strut members 40 and 41 which are hingedly connected at their outer ends, as at 42, to the upper arms 33 of the pairs of parallel arms 33 and 34. The connections 42 could, of course, be with arms 34 and could be located anywhere along the arms 33 or 34. Preferably, however, the connections are with arms 33 at the locations shown, namely, closer to the outer ends of arms 33 than to their inner ends. The inner ends of the foldable strut members 40 and 41 are joined together by a rivet 43, so constructed and arranged that the strut members 40 and 41 may pivot about the rivet 43 to the position shown in Figure 2. A stop member 44 in the form of a U-shaped sheet metal stamping is connected to the strut members 40 and 41 at the pivotal connection thereof by means of the rivet 43. The legs of the U-shaped member 44 are disposed to opposite sides of the strut members, the rivet 43 extending through the legs, and the bight portion thereof extends beneath the strut members to underlie the adjacent ends of the strut members The bight portion of the member 44 therefore is disposed to be engaged by both of the strut members in the extended position of the cart to prevent pivoting of the strut members beyond the horizontal position shown in Figure 1 in the direction of downward movement of the outer ends of the struts, the direction in which the struts tend to move due to loading of the cart, thus to rigidify the strut, to maintain the wheels in widely spaced relation and to brace the collapsible arm means in expanded position. Upon pivoting of the strut members in the opposite direction, the stop member 44 does not interfere with or lie in the path of movement of the strut members, and accordingly, accommodates ready collapsing of the strut and of the cart.

Referring now particularly to Figures 4, 5 and 6 of the drawings, the cart 10 is adapted to be towed by a tow bar or tow handle 45 including a handle grip 46 secured thereto. The tow bar 45 extends in a forward direction from the cart 10 and is preferably formed of tubular material as seen in Figure 5. A pair of substantially circular stampings 46 enclose a substantially circular detent plate 47. The stampings 46 are each provided with a semi-tubular extension 49 therefrom, and the detent plate 47 has an extension 51 therefrom, the extensions 49 and 51 being adapted, together, to fit within the socket 48 formed by the end of the hollow tow bar 45 and to be riveted to the tow bar 45 by a rivet 52. The substantially circular stampings 46, together with the detent plate 47, are adapted to be held between a pair of brackets 53, 53 which are held to the bracket 27 on each side of the center post 12 by means of the bolts 25. The towing arm 45, together with the detent plate 47 and the stampings 46 is adapted to pivot with respect to the bracket arms 53 on a bolt 55 passing through the bracket arms 53, the stampings 46 and the detent plate 47.

The detent plate 47 is provided with spaced slots 54, 56 and 57, arranged to cooperate with a detent member 58 held between a pair of ears 59 formed on the brackets 53, and arranged to pivot on a pin 61 passing through the detent member 58 and the spaced ears 59. The detent member 58 is formed with a lug 62 forming a support and guide for a detent latch spring 63 which is guided and supported at its other end by a lug 64 struck out from the bracket 27 at a point midway thereon and adjacent the center post 12. The detent member 58 is also formed with a manipulating arm 66 which is adapted to be engaged by the user of the cart 10 for manipulating the detent plate 58 and its detent arm 67, which arm 67 is adapted to be locked in slots 54, 56 or 57.

It will be seen that the detent 58 can be rocked about the pin 61, so that the detent arm 67 thereon will move out of engagement with any one of the detent slots 54, 56 or 57, whereby the position of the tow arm 45 may be adjusted with respect to the center post 12 of the cart 10. Spring 63 is an over-center spring which tends resiliently to maintain the detent member 58 and its detent arm 67 either in the locked positions in slots 54, 56 and 57 or in a completely released position away from said slots as indicated in dotted lines in Figure 5.

The detent slots 54 and 56 are preferably chosen so that, when the detent arm 67 is engaged in either slot, one or the other of a pair of convenient positions of the towing arm 54 will be had according to the stature of the user of the cart 10.

The arm 45 may also be rotated with respect to the brackets 53 and the center post 12 so that the detent arm 67 may engage the detent slot 57 (see, for example, the dotted line position 45' in Figure 4). The cart 10 may then be pivoted about the wheels 18, so that the handle 46 and the wheels 18, 18 provide a three point contact which will enable the cart 10 to occupy a more or less inclined position of rest, if desired. Such position is convenient when the user wishes to stop the cart on the course to draw a club from the golf bag for hitting the ball. The angle between tow rod 45 and center post 12 in such position permits a greater part of the weight on the cart being borne directly downwardly by the tow rod 45 than is possible when the full line position of tow rod 45 in Figure 4 is employed.

When the cart is in its collapsed position, the tow rod 45 may conveniently be positioned in a downward position, as shown fragmentarily in Figure 2, wherein the rod is disposed closely adjacent the center post 12. Rod 45 is then out of the way and the cart can be manipulated by hand grip 14. It will be observed from Figures 1 and 2 that the jointed strut 39 is so located that the tow bar 45 may be lowered, as described above, into close proximity to the center post 12. Bar 45 will stay in that position if the nut on bolt 55 is sufficiently drawn up to provide a yielding frictional grip between brackets 53 and the circular stampings 46 and detent plate 47.

The cart 10 is so arranged so that the golf bag 11 may be held in position adjacent the center post 12 and in a position on the rear side thereof. For this purpose the rearwardly extending portion of the lower end 16 of the center post 12 supports a plate 68 upon which the lower end of the golf bag may rest. The lower end of the golf bag 11 is also held between a pair of resilient arms 69 which are joined to a bracket 71 held to the center post 12 near the lower end 16 thereof.

The upper end of the bag 12 is held between resilient arms 72 which are joined to a bracket 73 supported on the center post 12. The resilient arms 72 and 69 are preferably so disposed with reference to the golf bag 11 that the resilient arms 72 and 69 may exert a pressure against the reinforcing ferrules commonly to be found on the lower and upper ends of the conventional golf bag. If desired, straps (not shown) may be employed to interconnect the ends of arms 69, or arms 72, so that the bag is encircled.

When the golf cart is being transported from place to place of use, it may be employed not only in the extended position of Figure 1, but also in the collapsed position as seen in Figure 2. In both the extended and collapsed positions of the cart the wheels 18 are substantially perpendicular to the ground and are in ground engaging position. Consequently, even when the cart is in the collapsed position, the cart 10, with the bag attached, may be wheeled around guided by the handle grip 14. If the user desires to place the cart in the normal or extended position as shown in Figure 1, where the wheels 18 are spread apart to give greater stability of the cart against lateral tipping, the user need only step upon the pedal 38 extending from the block 30. By pushing the block 30 in a downward direction along the center post 12, the pairs of parallel arms 33 and 34 together with the side braces 23, 23 will move to the extended position shown, that is, forwardly and outwardly with respect to the center post 12. In so doing, the jointed strut 39 consisting of the hinged strut members 40 and 41 will pivot on the arms 33, 33 to take the position as seen in Figure 1.

It will be apparent that the center post 12, the side brace members 23, 23 and the parallel arms 33 and 34, together with the jointed strut 39 consisting of the members 40 and 41, will assume a structure in space having a generally pyramidal shape, thus giving extreme rigidity to the cart when in the extended position shown in Figure 1. The jointed strut 39 minimizes any tendency of the side braces 23, 23 and the pairs of parallel arms 33 and 34 to wobble about the center post 12, thereby providing greater stability for the cart in traversing rough terrain and greater strength in any position of use.

The tow bar 45 is adapted to pivot about the pin 55, and to be locked in position by the detent arm 67 of detent plate 58 in either of the detent slots 54 or 56 according to the preference of the individual. When it is desired to maintain the cart 10 in a more or less recumbent position, the arm 45 may be further rotated about the pin 55 and the detent arm 67 may be locked in position in the detent slot 57.

The cart is also adapted to be maintained in a stable position with the golf bag 11 supported in a nearly upright position, in either the Figure 1 or Figure 2 positions, for the insertion or removal of clubs therefrom. When towed by the tow bar 45, the cart is, of course, inclined in a forward direction with the lower end 16 of center post 12 out of contact with the ground and with the center of gravity of the cart plus the bag being located substantially over a line joining the centers of wheels 18.

While a preferred embodiment of the invention has been shown for purposes of illustration, it will be appreciated that various modifications and changes coming within the scope of the invention, as defined by the cliams subjoined, will be suggested to others by reason of this disclosure. Therefore, the invention is not intended to be limited to the embodiment illustrated except insofar as the following claims are so limited.

I claim:

1. A two-wheel cart comprising a jointed frame structure including a center post adapted to provide part of the support for the object carried, a block fixed to said center post intermediate the ends of said post, said block providing a point of pivotal support for a pair of brace members comprising arms disposed one on each side of said center post, a tow bar supported for pivotal movement by said block to pivot with respect to said center post, said tow bar including detent means for releasably locking said tow bar in a desired position with respect to said center post, a second block providing a pivotal connection with said center post for a pair of arms extending one on each side from said center post, said second block being slidable on said center post, said arms being adapted to move with said second block into a position adjacent said center post in the collapsed position of the cart and to move with said second block into a position wherein said arms extend in a direction outwardly and forwardly from said center post in the extended position of the cart, connecting members disposed one on each side of said center post and each providing a support for an axle of one of a pair of ground engaging wheels, each of said connecting members affording pivotal connection for the outer ends of said arms, and a collapsible strut operatively connecting corresponding arms on opposite sides of said center post, said strut in the extended position of the cart being disposed in substantially a straight horizontal line and connecting said arms to minimize the tendency of said arms to twist about said center post when the cart is traversing irregular terrain, said strut being collapsible to accommodate collapsing of the cart.

2. In a two-wheel collapsible golf cart: an upstanding body; means for supporting a golf bag generally vertically on said body; a pair of axially aligned wheels, one on each side of the body; an axle for each wheel; a connector member on each axle; collapsible means connecting the wheels with the body and maintaining them in substantially parallel relationship and substantially perpendicular to the ground, whereby the loaded cart may be wheeled about in upright position in both the collapsed and expanded positions of the cart; said collapsible means comprising a first pair of brace members in the form of a pair of parallel arms on each side of said body pivotally connected at one set of ends with respect to the body and at their opposite ends to one of said connector members; a second pair of brace members in the form of an arm on each side of said body pivotally connected at one end with respect to the body and at its other end to one of said connector members; and a block mounted on said body for movement longitudinally thereof; at least one arm of the arms on each side of the body having pivotal connection with said body by means of said block; at least one arm of the arms on each side of the body having pivotal connection with respect to a fixed point on said body spaced from said block; said block being movable toward said fixed point on said body to move said arms and said wheels toward said body to a collapsed position, wherein said wheels are disposed adjacent the lower end of said body and slightly forwardly thereof, and being movable away from said fixed point on said body to move said arms and said wheels outwardly, upwardly and forwardly of said body to an expanded position; and a collapsible strut extending transversely of the plane of said wheels forwardly of said body and operatively connecting corresponding ones of said members on opposite sides of the body; said collapsible strut comprising a first strut element pivotally connected at one end thereof with respect to one of said members on one side of the body adjacent the respective wheel, a second strut element pivotally connected in a similar manner to the corresponding member on the other side of the body, a pin element pivotally connecting said strut elements at a point substantially aligned with the body at substantially equal distances from the wheels, said strut elements in the expanded position of the cart extending substantially horizontally between the wheels parallel to the wheel axles, and a stop carried by one of said strut and pin elements and engageable with both of said strut elements in the expanded position of the cart to prevent movement of said strut elements substantially beyond said horizontal position in the direction in which said strut elements would tend to move due to loading of the cart, said stop accommodating pivoting of said strut elements about said pin element in the opposite direction to accommodate collapsing of the strut and said collapsible means to the said collapsed position of the cart; said strut in its extended horizontal position maintaining said wheels in widely spaced parallel axially aligned relation and bracing said arms to retain the cart in its expanded position and to eliminate the tendency of said wheels to swivel and of said arms to twist about said body when the cart is traversing irregular terrain.

3. A wheeled collapsible golf cart comprising an upstanding body post, means on said body for supporting a golf bag generally vertically thereon, a pair of blocks on said body, a pair of spaced parallel wheels one on each side of said body, an axle for each wheel, said axles being aligned transversely and forwardly of the body in all positions thereof, a connector member on each axle, a pair of parallel arm members on either side of said body pivotally connected at one set of ends to one of said connector members and at their opposite ends to one of said blocks, a brace member on each side of said body pivotally connected at one end to one of said connector members and at its other end to the other of said blocks, one of said blocks being movable longitudinally of said body, said arm and brace members maintaining said wheels parallel to one another and perpendicular to the ground in all positions thereof, said movable block being movable toward the other of said blocks to move said arm members, said brace members and said wheels toward said body to a collapsed position wherein the wheels are disposed adjacent the lower end of said body and being movable away from the other of said blocks to move said arm members, said brace members and said wheels outwardly, upwardly and forwardly of said body to an expanded position, said wheels in either position being disposed for ground engagement whereby said cart is wheelable with the golf bag in both the expanded and collapsed positions of the cart, and a vertically collapsible strut extending transversely of the planes of said wheels forwardly of said body and operatively connecting corresponding ones of said members on opposite sides of the body, said collapsible strut comprising a first strut element operatively connected at one end thereof to one of said members on one side of said body adjacent the respective wheel to pivot with respect to said one member, a second strut element operatively connected in like manner to the corresponding member on the other side of said body, a pin element pivotally connecting said strut elements at a point aligned with said body at equal distances from said wheels, said strut elements in the expanded position of the cart extending horizontally between the wheels adjacent and parallel to said axles, and a stop carried by one of said strut and pin elements and engageable with both of said strut elements in the expanded position of the cart to prevent movement of said strut elements beyond said horizontal position in the direction of vertical movement in which the strut elements would tend to move due to loading of the cart, said stop accommodating pivoting of said strut elements about said pin element in the opposite direction to accommodate collapsing of the strut and said members to the said collapsed position of the cart, said strut in its extended horizontal position maintaining said wheels in widely spaced parallel axially aligned relation and bracing said arms to retain the cart in its expanded position and to eliminate the tendency of said wheels to swivel and of said arms to twist about said body when the cart is traversing irregular terrain.

References Cited in the file of this patent
UNITED STATES PATENTS

| | | |
|---|---|---|
| 1,064,538 | Quickel | June 10, 1913 |
| 1,576,075 | Tisdell | Mar. 9, 1926 |
| 1,802,400 | Benson | Apr. 28, 1931 |
| 2,249,123 | Fleck | July 15, 1941 |
| 2,492,981 | Gill | Jan. 3, 1950 |
| 2,518,803 | Marvin | Aug. 15, 1950 |
| 2,563,033 | Greig | Aug. 7, 1951 |
| 2,564,828 | Alexander | Aug. 21, 1951 |
| 2,613,083 | Moludy | Oct. 7, 1952 |
| 2,619,360 | Alter | Nov. 25, 1952 |